United States Patent
Sergeyev et al.

(10) Patent No.: US 9,801,207 B2
(45) Date of Patent: Oct. 24, 2017

(54) EVOLVED NODE-B AND METHODS FOR SUPPORTING CO-EXISTENCE WITH WI-FI NETWORKS IN AN UNLICENSED FREQUENCY BAND

(71) Applicant: Intel Corporation, Santa Clara, CA (US)

(72) Inventors: Vadim Sergeyev, Nizhny Novgorod (RU); Shafi Bashar, Santa Clara, CA (US); Alexei Davydov, Nizhny Novgorod (RU); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/473,008

(22) Filed: Aug. 29, 2014

(65) Prior Publication Data

US 2015/0146645 A1     May 28, 2015

Related U.S. Application Data

(60) Provisional application No. 61/909,938, filed on Nov. 27, 2013.

(51) Int. Cl.
*H04W 16/14* (2009.01)
*H04W 74/04* (2009.01)
(Continued)

(52) U.S. Cl.
CPC .......... *H04W 74/04* (2013.01); *H04B 7/2621* (2013.01); *H04L 1/0026* (2013.01);
(Continued)

(58) Field of Classification Search
CPC .................................................. H04B 7/2621
(Continued)

(56) References Cited

U.S. PATENT DOCUMENTS 8,265,065 B2 *   9/2012   Xu ..................... H04L 65/605
                                                                                             370/328
9,326,122 B2     4/2016   Xiong et al.
(Continued)

FOREIGN PATENT DOCUMENTS

CN         105359476 A     2/2016
CN         105359606 A     2/2016
(Continued)

OTHER PUBLICATIONS

U.S. Appl. No. 15/096,504, filed Apr. 12, 2016, User Equipment and Method for Packet Based Device-To-Device (D2D) Discovery in an LTE Network.

(Continued)

*Primary Examiner* — Mang Yeung
*Assistant Examiner* — Peter G Solinsky
(74) *Attorney, Agent, or Firm* — Schwegman Lundberg & Woessner, P.A.

(57) ABSTRACT

Embodiments of an eNB and method for supporting communication with UEs on an LTE network in an unlicensed frequency band are generally described herein. The eNB may be configured to transmit a first LTE signal that includes a first reference signal during an active transmission period of a Wi-Fi network in the unlicensed frequency band, and to restrict frequency spectra used for the transmission of the first LTE signal from frequency spectra used by the Wi-Fi network during the active transmission period. The first reference signal may enable maintenance of synchronization between the eNB and the UEs at least during the active transmission period. The eNB may be further configured to transmit a second LTE signal during a silence period of the Wi-Fi network in frequency spectra used by the Wi-Fi network during the active transmission period.

31 Claims, 8 Drawing Sheets

(51) Int. Cl.
| | |
|---|---|
| *H04L 5/00* | (2006.01) |
| *H04L 5/14* | (2006.01) |
| *H04W 72/04* | (2009.01) |
| *H04W 52/02* | (2009.01) |
| *H04W 76/04* | (2009.01) |
| *H04L 1/18* | (2006.01) |
| *H04L 29/08* | (2006.01) |
| *H04W 40/30* | (2009.01) |
| *H04L 12/825* | (2013.01) |
| *H04W 28/02* | (2009.01) |
| *H04B 7/26* | (2006.01) |
| *H04L 27/26* | (2006.01) |
| *H04W 72/02* | (2009.01) |
| *H04L 1/00* | (2006.01) |
| *H04W 88/06* | (2009.01) |
| *H04W 88/10* | (2009.01) |
| *H04W 36/00* | (2009.01) |
| *H04W 84/12* | (2009.01) |

(52) U.S. Cl.
CPC .......... *H04L 1/1825* (2013.01); *H04L 5/0007* (2013.01); *H04L 5/0032* (2013.01); *H04L 5/0051* (2013.01); *H04L 5/0073* (2013.01); *H04L 5/14* (2013.01); *H04L 27/2607* (2013.01); *H04L 47/25* (2013.01); *H04L 69/324* (2013.01); *H04W 16/14* (2013.01); *H04W 28/0205* (2013.01); *H04W 40/30* (2013.01); *H04W 52/0216* (2013.01); *H04W 52/0254* (2013.01); *H04W 72/02* (2013.01); *H04W 72/042* (2013.01); *H04W 72/048* (2013.01); *H04W 72/0413* (2013.01); *H04W 72/0446* (2013.01); *H04W 72/0453* (2013.01); *H04W 76/046* (2013.01); *H04W 76/048* (2013.01); *H04W 36/0083* (2013.01); *H04W 84/12* (2013.01); *H04W 88/06* (2013.01); *H04W 88/10* (2013.01); *Y02B 60/50* (2013.01)

(58) Field of Classification Search
USPC ........................................................ 370/329
See application file for complete search history.

(56) References Cited

U.S. PATENT DOCUMENTS

| | | | |
|---|---|---|---|
| 2006/0293061 A1 | 12/2006 | Kobayashi et al. | |
| 2007/0019578 A1 | 1/2007 | Meiri | |
| 2007/0165593 A1 | 7/2007 | Hundal et al. | |
| 2007/0297523 A1* | 12/2007 | Cattaneo | H04L 27/2626 375/260 |
| 2008/0063106 A1 | 3/2008 | Hahm et al. | |
| 2008/0119130 A1 | 5/2008 | Sinha | |
| 2008/0123591 A1* | 5/2008 | Jung | H04W 48/10 370/330 |
| 2008/0232798 A1* | 9/2008 | Kasezawa | H04B 10/0791 398/34 |
| 2008/0267162 A1 | 10/2008 | Benveniste | |
| 2009/0264142 A1* | 10/2009 | Sankar | H04L 5/0007 455/501 |
| 2009/0327395 A1 | 12/2009 | Park et al. | |
| 2010/0260169 A1* | 10/2010 | Gheorghiu | H04W 56/0015 370/350 |
| 2011/0028102 A1* | 2/2011 | Li | H04W 74/0816 455/71 |
| 2011/0080873 A1 | 4/2011 | Zhang et al. | |
| 2012/0064902 A1 | 3/2012 | Kronander et al. | |
| 2012/0113934 A1 | 5/2012 | Ko et al. | |
| 2012/0184306 A1 | 7/2012 | Zou et al. | |
| 2012/0207073 A1 | 8/2012 | Kim et al. | |
| 2012/0243431 A1 | 9/2012 | Chen et al. | |
| 2012/0249372 A1 | 10/2012 | Jovicic et al. | |
| 2012/0252442 A1* | 10/2012 | Fu | H04W 36/20 455/426.1 |
| 2012/0270584 A1 | 10/2012 | Liang et al. | |
| 2012/0307748 A1* | 12/2012 | Cheng | H04L 5/0005 370/329 |
| 2012/0309419 A1 | 12/2012 | Lee et al. | |
| 2013/0058306 A1 | 3/2013 | Noh et al. | |
| 2013/0195026 A1 | 8/2013 | Johnsson et al. | |
| 2013/0223356 A1 | 8/2013 | Khoshnevis et al. | |
| 2013/0230035 A1 | 9/2013 | Grandhi et al. | |
| 2013/0288608 A1 | 10/2013 | Fwu et al. | |
| 2013/0301492 A1 | 11/2013 | Ji et al. | |
| 2013/0301570 A1* | 11/2013 | Xu | H04L 5/0073 370/329 |
| 2013/0322276 A1 | 12/2013 | Pelletier et al. | |
| 2013/0329711 A1* | 12/2013 | Seo | H04J 11/0069 370/336 |
| 2013/0331137 A1* | 12/2013 | Burchill | H04W 52/243 455/501 |
| 2013/0336229 A1* | 12/2013 | Kakadia | H04W 72/1257 370/329 |
| 2014/0003262 A1 | 1/2014 | He et al. | |
| 2014/0031054 A1* | 1/2014 | Zou | H04W 72/082 455/452.2 |
| 2014/0036876 A1 | 2/2014 | Li et al. | |
| 2014/0044000 A1* | 2/2014 | Charbit | H04W 24/10 370/252 |
| 2014/0079016 A1* | 3/2014 | Dai | H04L 5/0041 370/330 |
| 2014/0082185 A1* | 3/2014 | Abraham | H04W 24/00 709/224 |
| 2014/0185529 A1 | 7/2014 | Lim et al. | |
| 2014/0213186 A1 | 7/2014 | Gage et al. | |
| 2014/0213259 A1 | 7/2014 | Teyeb et al. | |
| 2014/0241260 A1 | 8/2014 | Schmidt et al. | |
| 2014/0248917 A1* | 9/2014 | Scipione | H04W 72/0406 455/509 |
| 2014/0269494 A1* | 9/2014 | Zhu | H04W 40/246 370/328 |
| 2014/0370904 A1 | 12/2014 | Smith et al. | |
| 2014/0378157 A1* | 12/2014 | Wei | H04W 16/14 455/454 |
| 2015/0043448 A1 | 2/2015 | Chatterjee et al. | |
| 2015/0043687 A1* | 2/2015 | Luo | H04B 1/006 375/349 |
| 2015/0045016 A1 | 2/2015 | Xiong et al. | |
| 2015/0055588 A1* | 2/2015 | Yerramalli | H04W 72/0446 370/329 |
| 2015/0056931 A1* | 2/2015 | Yerramalli | H04B 17/00 455/67.13 |
| 2015/0063148 A1* | 3/2015 | Sadek | H04W 16/14 370/252 |
| 2015/0105067 A1* | 4/2015 | Valliappan | H04W 74/0808 455/424 |
| 2015/0118968 A1* | 4/2015 | Nory | H04W 36/0083 455/67.11 |
| 2015/0126196 A1 | 5/2015 | Lu et al. | |
| 2015/0146585 A1 | 5/2015 | Rashid et al. | |
| 2015/0163705 A1 | 6/2015 | Lu et al. | |
| 2015/0172870 A1* | 6/2015 | Venkatesan | G01S 13/06 455/456.1 |
| 2015/0223084 A1* | 8/2015 | Lightstone | H04W 24/08 370/252 |
| 2015/0319731 A1* | 11/2015 | Cui | G01S 5/10 455/456.1 |
| 2015/0334635 A1* | 11/2015 | Caretti | H04W 48/10 370/335 |
| 2015/0334693 A1 | 11/2015 | Lu et al. | |
| 2015/0341911 A1* | 11/2015 | Wakabayashi | H04J 11/0053 370/329 |

FOREIGN PATENT DOCUMENTS

| | | |
|---|---|---|
| KR | 102013003596 A | 4/2013 |
| TW | 201521505 A | 6/2015 |
| WO | WO-2012177002 A2 | 12/2012 |
| WO | WO-2013025057 A2 | 2/2013 |

(56) References Cited

FOREIGN PATENT DOCUMENTS

WO  WO-2015021267 A1  2/2015
WO  WO-2015021317 A1  2/2015
WO  WO-2015080796 A1  6/2015

OTHER PUBLICATIONS

U.S. Appl. No. 15/022,534, filed Mar. 16, 2016, WiFi Virtual Carrier Sense for LTE/WiFi Co-Channel Coordination.
"U.S. Appl. No. 14/314,957, Non Final Office Action mailed May 12, 2016", 32 pgs.
"U.S. Appl. No. 15/022,534, Preliminary Amendment filed on Mar. 16, 2016", 8 pgs.
"International Application Serial No. PCT/US2014/050128, International Preliminary Report on Patentability mailed Feb. 18, 2016", 9 pgs.
"International Application Serial No. T/US2014/050209, International Preliminary Report on Patentability mailed Feb. 19, 2016", 10 pgs.
"U.S. Appl. No. 14/280,799, Non Final Office Action mailed Jul. 13, 2015", 34 pgs.
"U.S. Appl. No. 14/280,799, Response filed Aug. 27, 2015 to Non Final Office Action mailed Jul. 13, 2015", 11 pgs.
"Discussion of D2D discovery methods", R1-132068, 3GPP TSG RAN WG1 Meeting #73, (May 2013), 1-5.
"Discussion on design options for D2D discovery", R1-131924, 3GPP TSG RAN WG1 Meeting #73, (May 2013), 1-6.
"International Application Serial No. PCT/US2014/050128, International Search Report mailed Nov. 13, 2014", 8 pgs.
"International Application Serial No. PCT/US2014/050128, Invitation to Correct Defects mailed Aug. 14, 2014", 4 pgs.
"International Application Serial No. PCT/US2014/050128, Written Opinion mailed Nov. 13, 2014", 7 pgs.
"International Application Serial No. PCT/US2014/050209, International Search Report mailed Nov. 27, 2014", 3 pgs.
"International Application Serial No. PCT/US2014/050209, Written Opinion mailed Nov. 27, 2014", 8 pgs.
"International Application Serial No. PCT/US2014/057619, International Search Report mailed Dec. 26, 2014", 3 pgs.
"International Application Serial No. PCT/US2014/057619, Written Opinion mailed Dec. 26, 2014", 6 pgs.
"ProSe direct communication (D2D)", R1-132174, 3GPP TSG-RAN WG1 Meeting #73, Renesas Mobile Europe Ltd, (May 2013), 1-4.
"Study on LTE Device to Device Proximity Services", 3GPP TSG RAN Meeting#58, RP-122009, Qualcomm Incorporated, [Online]. Retrieved from the Internet: <URL: http://www.3gpp.org/ftp/tsg_ran/TSG_RAN/TSGR_58/Docs/RP-122009.zip>, (2012), 6 pgs.
"Taiwanese Application Serial No. 103125302, Office Action mailed Sep. 23, 2015", W/ English Translation, 7 pgs.
"Techniques for D2D Discovery", R1-132503, 3GPP TSG RAN WG1 Meeting #73, (May 2013), 1-7.
Andreev, S., et al., "Efficient small data access for machine-type communications in LTE", 2013 IEEE International Conference on Communications (ICC), (2013), 3569-3574.
Ericsson, et al., "D2D for LTE Proximity Services: Overview", 3GPP TSG-RAN WG1 #73, R1-132028, (May 2013), 6 pgs.

\* cited by examiner

500

- 505 — DETERMINE A Wi-Fi DEVICE OPERATING AS PART OF THE Wi-Fi NETWORK
- 510 — DETERMINE AN OCCURRENCE OF A SILENCE PERIOD OR AN ACTIVE TRANSMISSION PERIOD OF THE Wi-Fi NETWORK
- 515 — DETERMINE THE SILENCE PERIOD AS A TIME PERIOD IN WHICH THE ENB PREDICTS THAT TRANSMISSION OF WIRELESS SIGNALS FROM THE Wi-Fi DEVICE IS RESTRICTED
- 520 — TRANSMIT A SILENCE INDICATOR THAT ENABLES ONE OR MORE OF THE UES TO DETERMINE AN OCCURRENCE OF A SILENCE PERIOD OR AN ACTIVE TRANSMISSION PERIOD OF THE Wi-Fi NETWORK
- 525 — TRANSMIT A FIRST LTE SIGNAL THAT INCLUDES A FIRST REFERENCE SIGNAL DURING AN ACTIVE TRANSMISSION PERIOD OF A Wi-Fi NETWORK
- 530 — RESTRICT FREQUENCY SPECTRA USED FOR THE TRANSMISSION OF THE FIRST LTE SIGNAL
- 535 — TRANSMIT A SECOND LTE SIGNAL DURING A SILENCE PERIOD OF THE Wi-Fi NETWORK

*FIG. 5*

EVOLVED NODE-B AND METHODS FOR SUPPORTING CO-EXISTENCE WITH WI-FI NETWORKS IN AN UNLICENSED FREQUENCY BAND

PRIORITY CLAIM

This application claims priority under 35 USC 119(e) to U.S. Provisional Patent Application Ser. No. 61/909,938, filed Nov. 27, 2013 which is incorporated herein by reference in its entirety.

TECHNICAL FIELD

Embodiments pertain to wireless communications. Some embodiments relate to cellular communication networks including LTE networks. Some embodiments relate to communication in unlicensed frequency bands. Some embodiments relate to co-existence with Wi-Fi networks.

BACKGROUND

Some communication networks may be designed to operate in unlicensed frequency bands, such as various Industrial, Scientific, and Medical (ISM) bands in the United States. While some networks may be designed primarily for such use in the unlicensed bands, other networks operating in licensed bands may utilize the unlicensed bands to off-load traffic in some cases. For instance, demand for bandwidth in the licensed bands may be at or above capacity in a crowded area.

Operation in an unlicensed band is generally permitted for a device that has been certified as compliant with regulations governing the band, which may be created and enforced by a regulatory body such as the FCC. As such, it is possible that many devices of different types may be operating in an unlicensed band simultaneously and perhaps without any coordination between them. Naturally, the devices may interfere with each other, and may degrade overall performance and capacity of the band. As such, there are general needs for systems and methods for reducing interference and other effects between devices and for communication protocols that foster co-existence.

BRIEF DESCRIPTION OF THE DRAWINGS

FIG. 5 illustrates the operation of a method for communicating in an unlicensed frequency band in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a User Equipment (UE) or an Evolved Node-B (eNB) configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

Figure 1:
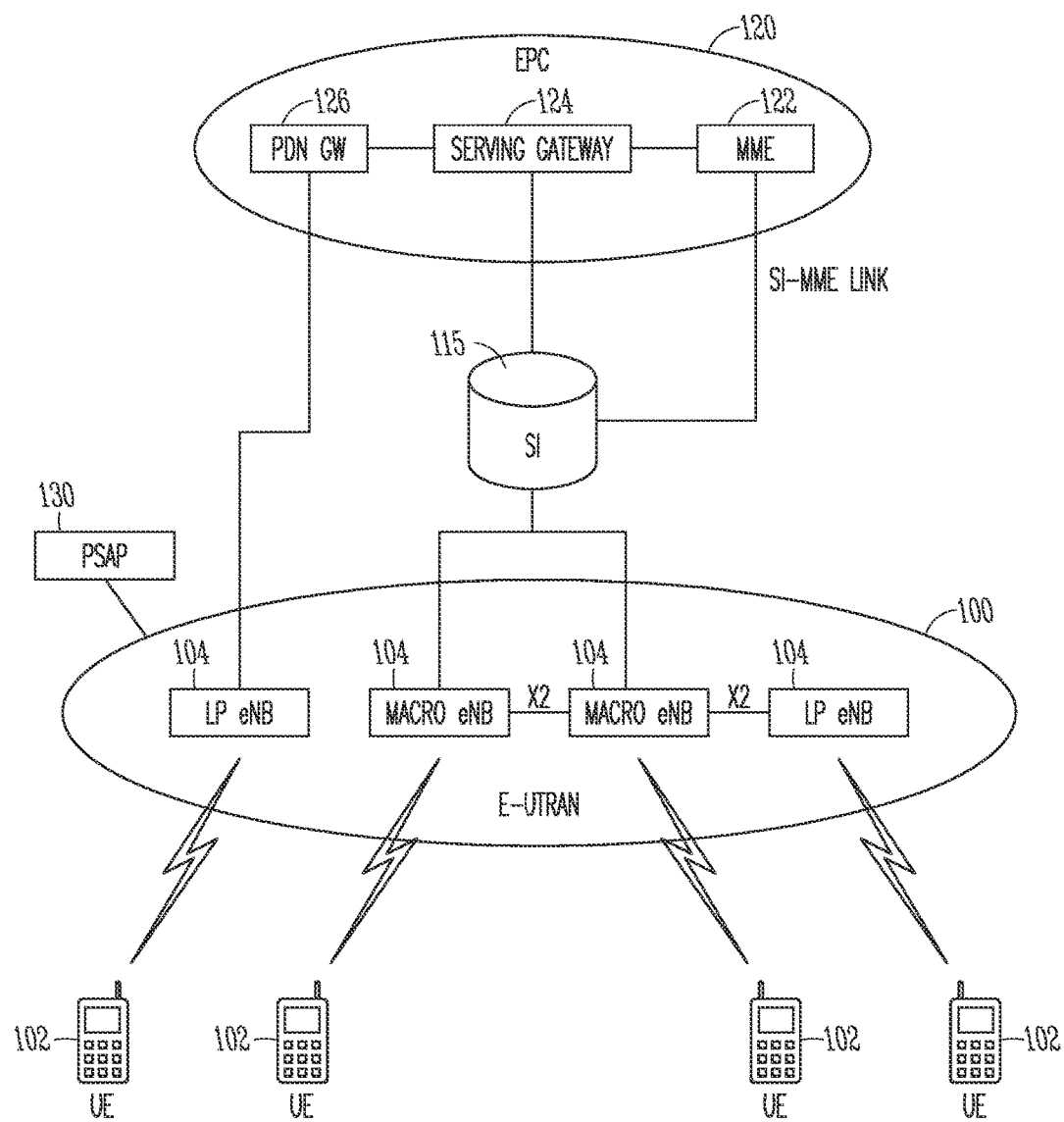
FIG. 1 is a functional diagram of a 3GPP network in accordance with some embodiments.

FIG. 1 shows a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes enhanced node B's (eNBs) 104 (which may operate as base stations) for communicating with UE 102. The eNBs 104 may include macro eNBs and low power (LP) eNBs.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and low power) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
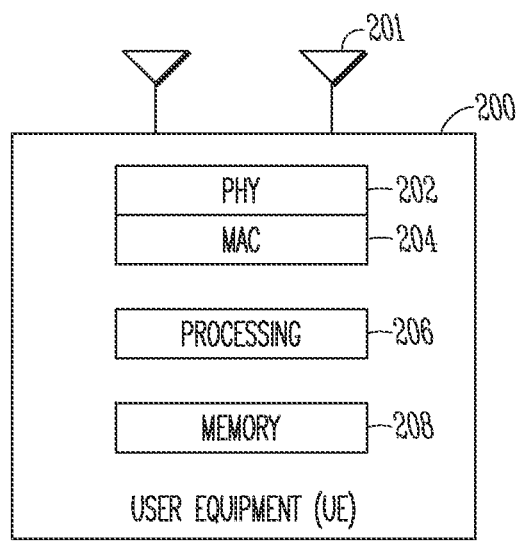
FIG. 2 is a functional diagram of a User Equipment (UE) in accordance with some embodiments.
Figure 3:
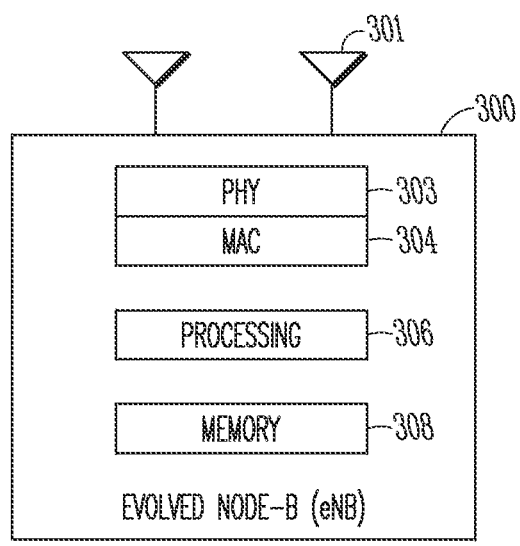
FIG. 3 is a functional diagram of an Evolved Node-B (eNB) in accordance with some embodiments.

FIG. 2 shows a block diagram of a UE 200 in accordance with some embodiments, while FIG. 3 shows a block diagram of an eNB 300 in accordance with some embodiments. It should be noted that in some embodiments, the eNB 300 may be a stationary non-mobile device. The UE 200 may be a UE 102 as depicted in FIG. 1, while the eNB 300 may be an eNB 104 as depicted in FIG. 1. The UE 200 may include physical layer circuitry 202 for transmitting and receiving signals to and from the eNB 300, other eNBs, other UEs or other devices using one or more antennas 201, while the eNB 300 may include physical layer circuitry 302 for transmitting and receiving signals to and from the UE 200, other eNBs, other UEs or other devices using one or more antennas 301. The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein, and the eNB 300 may also include processing circuitry 306 and memory 308 arranged to perform the operations described herein.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

Although the UE 200 and eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the eNB 104 may be configured to communicate with one or more UEs 102. The eNB 104 may transmit a first LTE signal that includes a first reference signal during an active transmission period of a Wi-Fi network in the unlicensed frequency band, and may restrict frequency spectra used for the transmission of the first LTE signal from frequency spectra used by the Wi-Fi network during the active transmission period. In some embodiments, the first reference signal may enable maintenance of synchronization between the eNB 102 and the UEs 104 at least during the active transmission period of the Wi-Fi network. The eNB 102 may be further configured to transmit a second LTE signal during a silence period of the Wi-Fi network in frequency spectra used by the Wi-Fi network during the active transmission period. These embodiments are described in more detail below.

In some cases, communication networks may operate in unlicensed frequency bands if the networks and supported devices operate in accordance with regulations regarding the band. Such regulations may be designed and enforced by a governing body such as the Federal Communication Commission (FCC). As an example, there are multiple Industrial, Scientific, and Medical (ISM) bands available in the United States for usage by compliant devices. In general, the compliance rules are formulated to foster co-existence between devices operating in the band. It is expected that some of the devices will operate without coordination, and will therefore interfere with each other. The compliance rules generally aim to minimize or mitigate these effects in order to enable maximum utility of the band for any compliant device that wishes to use it.

Figure 4:
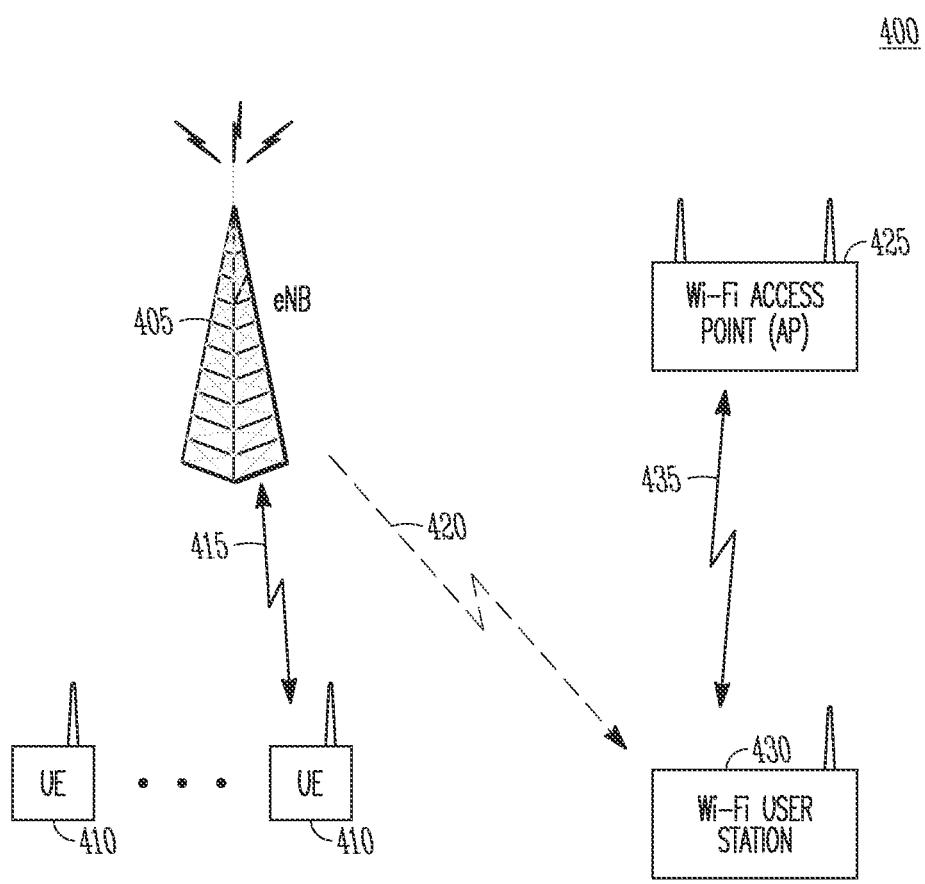
FIG. 4 is an example of a co-existence scenario that includes a 3GPP network and a Wi-Fi network in accordance with some embodiments.

Referring to FIG. 4, an example of a co-existence scenario 400 that may occur is shown. Although the discussion below may refer to communication on unlicensed frequency bands, it is understood that some or all of the techniques and operations described may also apply to communication on licensed frequency bands in some cases. In the scenario 400, an eNB 405 is shown in communication with one or more UEs 410, while a Wi-Fi AP 425 is in communication with a Wi-Fi user station (STA) 430, with both communications taking place within the same unlicensed frequency band. It should be understood that techniques and operations described may also apply to other scenarios with more or fewer devices present or with different types of devices. In addition, the eNB 405 in the scenario 400 is shown as being part of a communication tower for illustration only and is not limited to this configuration. The eNB 405 may communicate with a UE 410 over the link 415, while the Wi-Fi AP 425 may communicate with the Wi-Fi STA 430 over the link 435. In addition, the communication by the eNB 405 may cause unwanted interference to affect other components. As an example, interference from the eNB 405 may be received at the Wi-Fi STA 430 over the path 420, which is demarcated in dotted-line configuration to emphasize that it is interference from the Wi-Fi STA 430 perspective, and not part of a communication link. Such interference may be particularly harmful in the scenario 400 with the communication links 415, 435 operating in the same unlicensed frequency band. It should also be noted that the eNB 405 may be an eNB 104 or eNB 300 as described earlier, and that the UE 410 may be a UE 102 or UE 200 as described earlier.

Referring to FIG. 5, a method 500 of communicating with UEs in an unlicensed frequency band is shown. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-9, although it is understood that the method 500 may be practiced with any other suitable systems, interfaces and components. For example, reference may be made to the co-existence scenario 400 in FIG. 4 described earlier for illustrative purposes, but the techniques and operations of the method 500 are not so limited.

In addition, while the method 500 and other methods described herein may refer to eNBs 405 or UEs 410 operating in accordance with 3GPP or other standards, embodiments of those methods are not limited to just those eNBs 405 or UEs 410 and may also be practiced on other mobile devices, such as a Wi-Fi access point (AP) or user station (STA). Moreover, the method 500 and other methods described herein may be practiced by wireless devices configured to operate in other suitable types of wireless communication systems, including systems configured to operate according to various IEEE standards such as IEEE 802.11.

At operation 505 of the method 500, one or more Wi-Fi devices operating as part of the Wi-Fi network may be determined. An occurrence of a silence period or active transmission period of the Wi-Fi network may be determined at operation 510. At operation 515, the silence period may be determined as a time period in which the eNB 405 predicts that transmission of wireless signals from the Wi-Fi device is restricted.

The Wi-Fi network may be operating geographically close enough to the LTE network such that the LTE and Wi-Fi networks and devices interfere with each other. In some cases, the LTE network or the eNB 405 may determine that there are one or more Wi-Fi networks or devices operating in proximity and may track them accordingly. In some embodiments, the determination may be performed though analysis of received signals at the eNB 405 or elsewhere in the LTE network. As an example, the eNB 405 may monitor for energy from Wi-Fi signals using any suitable techniques. For instance, the eNB 405 may analyze the entire unlicensed band to identify concentrations of energy in the frequency domain and to analyze their bandwidth or other characteristics that may suggest that they result from Wi-Fi transmissions. In addition, locations in frequency of previously identified Wi-Fi networks or devices may also be used as input for such algorithms. Accordingly, information such as the carrier frequency, bandwidth or type of Wi-Fi signal being used may be known or estimated at the eNB 405.

Figure 6:
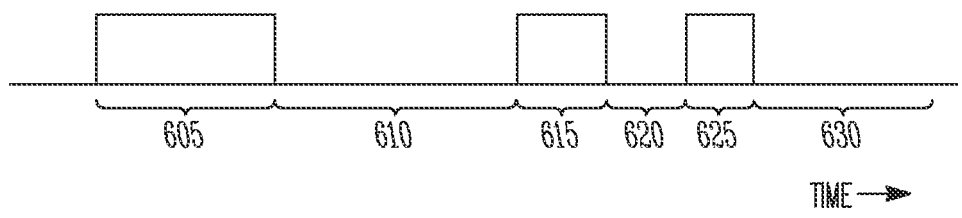
FIG. 6 illustrates an example of a Wi-Fi transmission in accordance with some embodiments.

In some cases, Wi-Fi networks or devices may transmit signals at non-uniform intervals or in an intermittent fashion. Referring to FIG. 6, an example of Wi-Fi transmission by a Wi-Fi device is shown. The time periods 605, 615, and 625 in which the Wi-Fi device transmits signals may be considered "active transmission periods" while the time periods 610, 620, and 630 may be considered "silence periods" as the Wi-Fi device does not transmit signals during those periods. The intermittent transmission described earlier can be seen in the example as well, with the silence periods 610, 620, 630 of vastly different durations. The lengths of the active transmission periods 605, 615, 625 may also be different in some cases, and is reflected in the example in FIG. 6 also. It should be noted that although this example focuses on a single Wi-Fi device, a Wi-Fi network may have multiple devices active. Accordingly, an active transmission period in that case may be defined as a time period in which at least one of the Wi-Fi devices is transmitting while a silence period may be defined as a time period in which none of the Wi-Fi devices is transmitting.

Determination of a silence period or active transmission period may be performed based at least partly on reception at the eNB 405 of wireless signals transmitted from one or more Wi-Fi devices operating as part of the Wi-Fi network. In some embodiments, the received energy at the eNB 405 over a frequency bandwidth occupied by a determined Wi-Fi device may be monitored in time to determine periods in which the Wi-Fi device is or is not transmitting and to classify those time periods as silence or active transmission periods. In some embodiments, the silence period may be a time period in which the eNB 405 predicts that transmission of wireless signals from the Wi-Fi device will be restricted or refrained from. In some embodiments, the active transmission period may be a time period in which the eNB 405 predicts that transmission of wireless signals from the Wi-Fi device will be performed. As a non-limiting example, the eNB 405 may attempt to predict a pattern of silence or active transmission periods using observations of previous transmissions by the Wi-Fi device along with knowledge about a Wi-Fi protocol being used.

In the previously described operations, the eNB 405 may analyze or predict the behavior of the Wi-Fi network or devices through reception of signals from the network or devices that are not actually intended for the eNB 405. As such, the previously described techniques may apply to situations in which the LTE and Wi-Fi networks are configured to operate independently from each other without coordination, but are not limited as such. In some embodiments, coordinated LTE and Wi-Fi networks may apply the previously described techniques related to reception of signals in addition to, or instead of, exchanging information about network or device behavior through techniques such as inter-network signaling.

Returning to the method 500, at operation 520, a silence indicator that enables one or more of the UEs 410 to determine an occurrence of a silence period or an active transmission period of the Wi-Fi network may be transmitted. In some embodiments, the silence indicator may include a time at which the silence period or active transmission period may occur. In some embodiments, the silence indicator may include an indication that the Wi-Fi network is currently in, or believed to be currently in, the silence period or active transmission period. It should be noted that, depending on protocol and implementation, the silence indicator may characterize or refer to the silence period or the active transmission period or both.

In some embodiments, the silence indicator may be transmitted by the eNB 405 to the UE 410 in the unlicensed frequency band as part of an LTE signal, such as a data or control signal. However, these embodiments are not limiting, as the silence indicator may be transmitted by the eNB 405 to the UE 410 in any suitable manner. In some embodiments, the transmission of the silence indicator may occur on a licensed frequency band that is different from, or disjoint from, the unlicensed frequency band. Such embodiments may apply to previously described situations in which devices or networks operating in licensed frequency bands utilize unlicensed bands to handle overflow traffic during busy situations, in which the eNB 405 and UE 410 may be communicatively coupled over both licensed and unlicensed frequency bands simultaneously. As such, the eNB 405 and UE 410 may exchange information, such as the silence indicator, about operation in the unlicensed band by communicating the information in the licensed band. As another example, the silence indicator may be transmitted in a different unlicensed frequency band.

At operation 525 of the method 500, a first LTE signal that includes a first reference signal may be transmitted during an active transmission period of a Wi-Fi network. At operation 530, the frequency spectra used for the transmission of the first LTE signal may be restricted. In some embodiments, those frequency spectra may be restricted from frequency spectra used by the Wi-Fi network during the active transmission period of the Wi-Fi network. At operation 535, a second LTE signal may be transmitted during a silence period of the Wi-Fi network Devices in the Wi-Fi network, such as the AP 425 and STA 430, may transmit intermittently in some cases, thus creating silence periods and active transmission periods. During active transmission periods of the Wi-Fi network, the LTE network may refrain from transmitting a full bandwidth LTE signal in order to foster co-existence by attempting to minimize impact on Wi-Fi operation. However, during the active transmission periods, it may still be desired that the eNB 405 and UE 410 at least maintain synchronization, and the first reference signal may be transmitted as part of the first LTE signal for this purpose.

Figure 7:
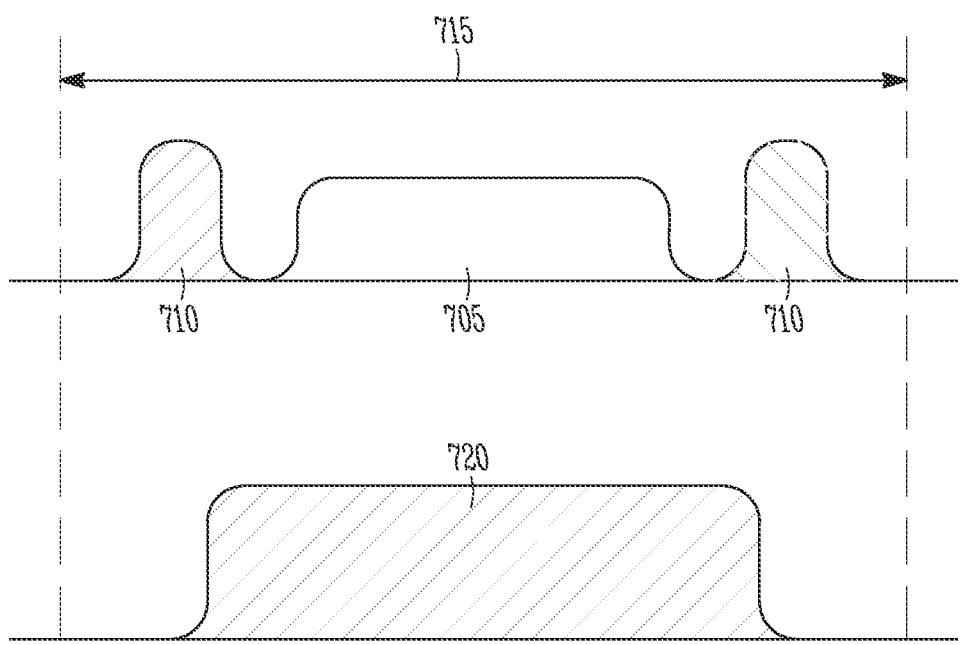
FIG. 7 illustrates an example of transmissions of LTE and Wi-Fi networks operating in the same frequency band in accordance with some embodiments.

The transmission of the first LTE signal may be restricted to frequency gaps of the Wi-Fi network. Referring to FIG. 7, a non-limiting example of such a transmission is shown. The Wi-Fi signal 705 is transmitted in the center part of the unlicensed band 715, while the first LTE signal 710 is transmitted in gaps at both edges of the Wi-Fi signal 705. For clarity, the LTE signal 710 is demarcated with diagonal lines in its spectra while the Wi-Fi signal 705 is shown without those lines. In other scenarios, the center frequency of the Wi-Fi signal 705 may be in a different location, such as the far left side of the unlicensed band 715. In that case, the first LTE signal 710 could instead be transmitted in the resulting frequency gap that would be on the right side of the unlicensed band 715.

In addition, transmission of the first LTE signal 710 may be restricted such that it does not provide a level of adjacent channel interference (ACI) that is above a threshold. That is, the first LTE signal 710 (like all signals) has out-of-band emissions that will interfere with the adjacent Wi-Fi signal 705 in this case. It is understood that some level of ACI will result, so the first LTE signal 710 may be transmitted in frequency spectra with sufficient distance between itself and the Wi-Fi signal 705 in frequency according to one or more suitable criteria. For example, it may be considered acceptable that less than 0.1% of an average radiated power in the transmission of the first LTE signal 710 interferes with the frequency spectra used by the Wi-Fi signal 705 during the active transmission period of the Wi-Fi network. The example threshold of 0.1% is not limiting, however, as other appropriate thresholds such as 1.0%, 0.01% or others may be used in some embodiments. As another example, an LTE interference average power level caused to the frequency spectra used by the Wi-Fi signal 705 during the active transmission period of the Wi-Fi network may be compared to a threshold. The threshold may be related to a Wi-Fi average power level in the Wi-Fi frequency spectra, an average power level of a Wi-Fi device operating in the Wi-Fi network or a reference average power level of the Wi-Fi network. An example threshold may be 1.0%, but this value is not limiting, as other appropriate thresholds such as 0.1%, 0.01% or others may be used in some embodiments.

At operation 535, a second LTE signal may be transmitted during a silence period of the Wi-Fi network. Accordingly, as the Wi-Fi network may not be transmitting or receiving during the silence period, the LTE network may be able to transmit the second LTE signal in a format or manner that is different from that used for transmission of the first LTE signal. In some embodiments, the second LTE signal may be transmitted in frequency spectra that includes at least a portion of the frequency spectra used by the Wi-Fi network during the active transmission period of the Wi-Fi network. As an example, referring back to FIG. 7, the second LTE signal 720 (also demarcated with diagonal lines in its spectra) may occupy much more bandwidth than the first LTE signal 710, and the frequency spectra used to transmit it may encompass the entire frequency spectra used for transmission of the Wi-Fi signal 705. This example is not limiting, as the spectra used for transmission of the second LTE signal 720 may only partially overlap the spectra used for transmission of the Wi-Fi signal 705 in some embodiments.

In some embodiments, the second LTE signal 720 may be an LTE signal that would be transmitted during normal operation. The second LTE signal 720 may include a data signal and may also include a second reference signal that enables determination of channel state information (CSI) or maintenance of synchronization with the UE 410. It should be noted that reference signals transmitted as part of the second LTE signal 720, or as part of an LTE signal transmitted during normal operation, may be spread across the entire bandwidth of the LTE signal in some embodiments. This format for the second reference signal is clearly not possible to fit into the first LTE signal 710 shown in FIG. 7, so it is understood that the first reference signal may be of an entirely different format than reference signals used in the second LTE signal 720 or other LTE signals. It should also be noted that the first LTE signal 710 may include other signals, such as a data or control signal, in addition to the first reference signal.

To further reduce the effects of the first LTE signal 710 on the Wi-Fi signal 705, the first LTE signal 710 may be transmitted at a reduced power level in comparison to the power level used for transmission of the second LTE signal 720. In a similar fashion, the first reference signal may be transmitted at a reduced power level in comparison to the power level used for transmission of the second reference signal. In some embodiments, the difference in average transmit power between two such signals may be 10 dB, but the difference is not so limited and can be 5, 20, 30 dB or any suitable number. In some embodiments, the difference can be 0 dB, meaning that the two signals are transmitted at the same average power level. In some embodiments, the first reference signal or first LTE signal 710 may be transmitted at a higher power level than the second reference signal or second LTE signal 720, with a difference of 5, 10, 20, 30 dB or any other suitable number.

In some embodiments, the first and second LTE signals 710, 720 may be orthogonal frequency division multiplexing (OFDM) signals comprising first and second resource elements (REs) respectively. The first reference signal may occupy first reference signal REs of the first LTE signal 710 while the second reference signal may occupy second reference signal REs of the second LTE signal 720. As described above, a difference in or equivalence of average transmit power of the first and second reference signal may apply to the first reference signal REs and second reference signal REs. The first or second reference signal REs may be spread, allocated or distributed in any appropriate manner over the allocated frequency bandwidth or OFDM symbols. Data signals included in the first and second LTE signals 710, 720 may occupy REs that are different than those occupied by the first and second reference signal REs respectively.

In some embodiments, the first reference signal may also be longer than the second reference signal in time or may be repeated for diversity benefits in order to compensate for the reduced bandwidth of the frequency spectra available for transmission of the first LTE signal 710 in comparison to the second LTE signal 720. Such an expansion in time may also be performed in order to compensate for a transmit power reduction of the first LTE signal 710. For instance, if the first LTE signal 710 is transmitted 3 dB below the second LTE signal 720 in order to mitigate its effect on the Wi-Fi signal 705, the length of the first reference signal may be doubled in length or repeated in order to enable the UE 410 to collect energy (through correlation or other detection operations) for twice as long as before the doubling.

Figure 8:
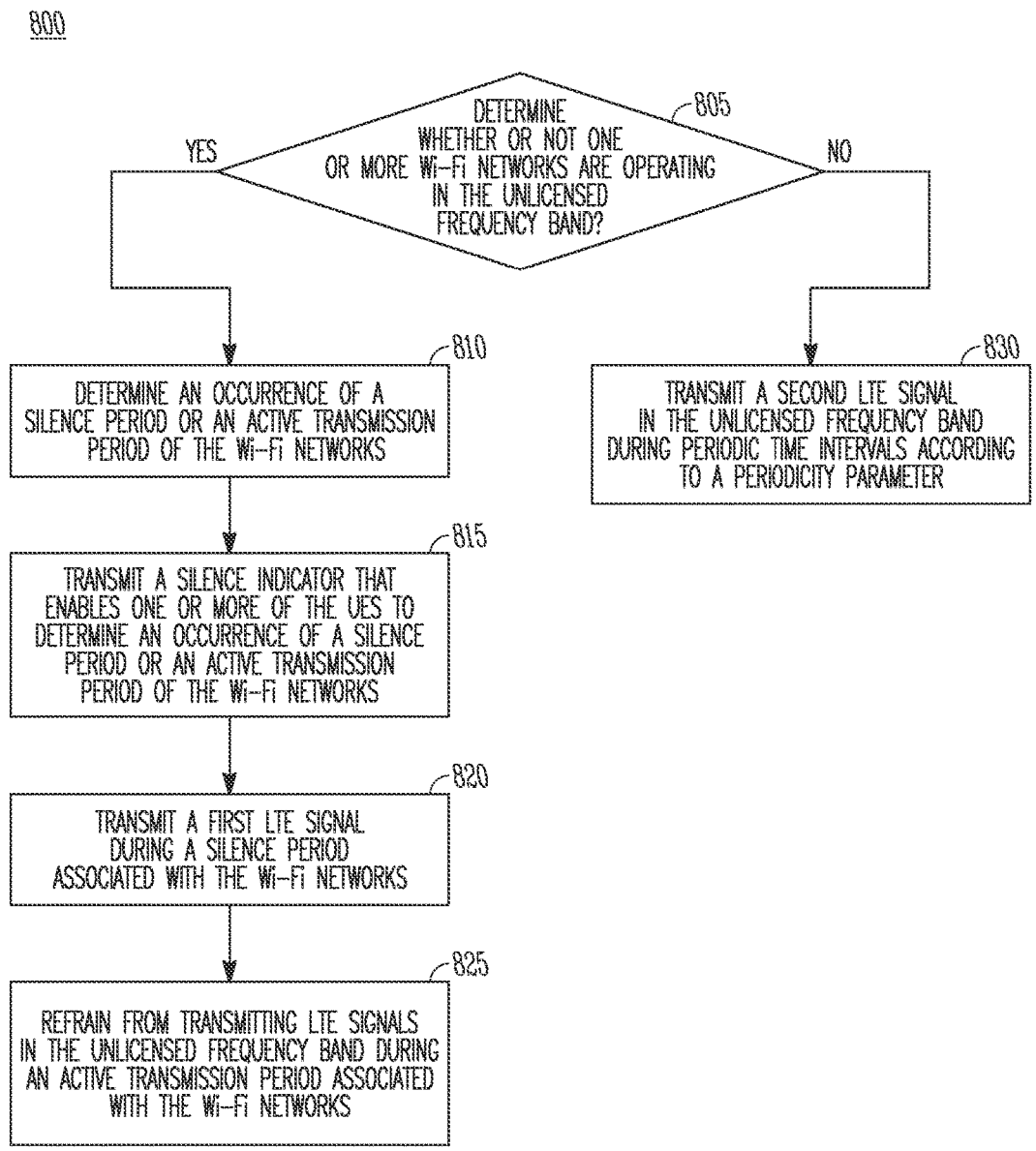
FIG. 8 illustrates the operation of a method for communicating in an unlicensed frequency band in accordance with some embodiments.

Referring to FIG. 8, a method 800 of communicating with UEs in an unlicensed frequency band is shown. As mentioned previously regarding the method 500, embodiments of the method 800 may include additional or even fewer operations or processes in comparison to what is illustrated in FIG. 8, and embodiments of the method 800 are not necessarily limited to the chronological order that is shown in FIG. 8. In describing the method 800, reference may be made to FIGS. 1-7 and 9, although it is understood that the method 800 may be practiced with any other suitable systems, interfaces and components. For example, reference may be made to the co-existence scenario 400 in FIG. 4 described earlier for illustrative purposes, but the techniques and operations of the method 800 are not so limited. In addition, embodiments of the method 800 may refer to eNBs 405, UEs 410, APs, STAs or other wireless or mobile devices.

At operation 805, it may be determined whether or not one or more Wi-Fi networks are operating in an unlicensed frequency band. In some embodiments, when it is determined that one or more Wi-Fi networks are operating in the unlicensed frequency band (the outcome of operation 805 is "yes"), the method 800 may proceed to any or all of operations 810-825. In those embodiments, when it is determined that Wi-Fi networks are not operating in the unlicensed frequency band (outcome of operation 805 is "no"), the method 800 may proceed to operation 830. This logic flow is not limiting, however, as some embodiments of the method 800 may include some, none or all of the operations 810-830 in response to different possible outcomes of operation 805. As an example, operations 810 or 815 may be performed even when the outcome of the operation 805 is "no," in some embodiments. In any case, it should be noted that previously described techniques and operations for determining the presence of Wi-Fi networks may be applied at operation 805, including those described regarding the method 500 in FIG. 5. As an example, the determination may be based at least partially on reception of wireless signals transmitted from one or more of the Wi-Fi networks. It should be noted that the Wi-Fi networks may or may not operate independently from the LTE network in which the eNB 405 operates. In addition, although reference may be made to Wi-Fi networks, techniques may also apply to Wi-Fi devices, which may or may not be part of a Wi-Fi network.

At operation 810, an occurrence of a silence period or an active transmission period of the Wi-Fi networks may be determined. A silence indicator that enables one or more of the UEs to determine an occurrence of a silence period or an active transmission period of the Wi-Fi networks may be transmitted at operation 815. Previously described techniques and operations related to determination of the silence period or active transmission period and transmission of the silence indicator may be applied, including those described regarding the method 500 in FIG. 5. As an example, the silence indicator may be transmitted in a licensed frequency band that is disjoint from the unlicensed frequency at operation 815.

At operation 820, a first LTE signal may be transmitted during a silence period associated with the Wi-Fi networks. At operation 825, the eNB 405 may refrain from transmitting LTE signals in the unlicensed frequency band during the active transmission period associated with the Wi-Fi networks. Accordingly, the performance of operation 825 may enable or improve the co-existence of the LTE and Wi-Fi networks in the unlicensed band, as the LTE may avoid interfering with the Wi-Fi network during active periods of the Wi-Fi network.

Figure 9:
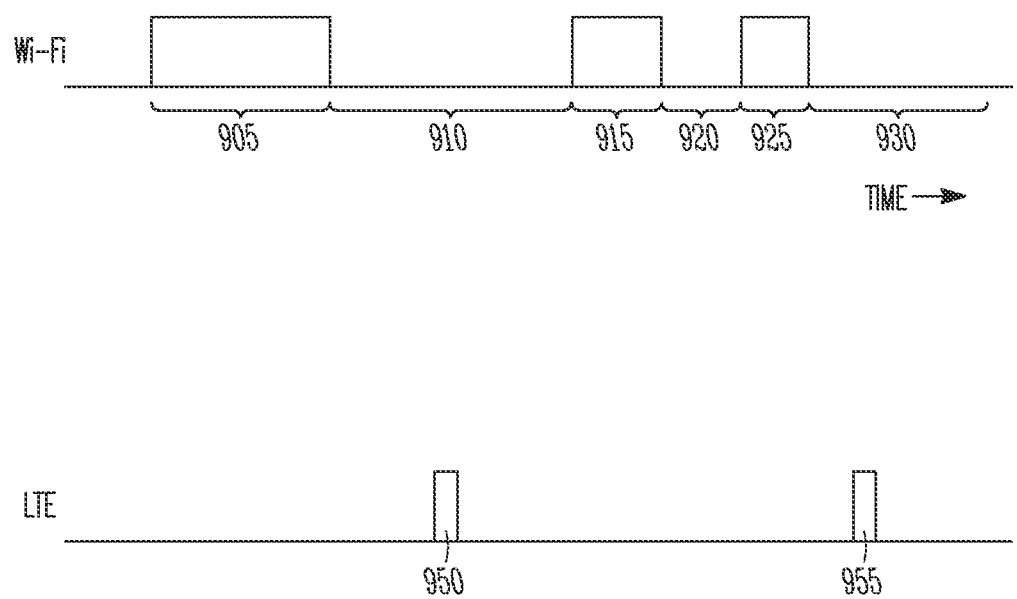
FIG. 9 illustrates an example of transmissions of LTE and Wi-Fi networks operating in the same frequency band in accordance with some embodiments.

A non-limiting example in FIG. 9 illustrates these concepts. The Wi-Fi transmissions during the active transmission periods 905, 915, 925 are avoided by the LTE network. The silence periods 910, 920, 930 of the Wi-Fi network may be used by the LTE network for transmission of the first LTE signal 950, 955.

The first LTE signal 950, 955 may include a first reference signal that enables maintenance of synchronization between the eNB 405 and the UE 410, and may also include a data or control signal. In addition, the first LTE signal 950, 955 may be an orthogonal frequency division multiplexing (OFDM) signal comprising first REs, and the first reference signal may occupy first reference signal REs of the first REs. The first LTE signal 950, 955, in some embodiments, may be transmitted in spectra that include any portion of or all of the unlicensed frequency band.

At operation 830, the eNB 405 may transmit a second LTE signal in the unlicensed frequency band during periodic time intervals according to a periodicity parameter. The second LTE signal, in some embodiments, may be transmitted in spectra that include any portion of or all of the unlicensed frequency band. The transmission of the second LTE signal may occur when it is determined at operation 805 or another operation that there are no Wi-Fi networks operating in the unlicensed frequency band. As such, the LTE network may assume that there are no other devices or networks operating in the unlicensed band that must be avoided, and may simply transmit LTE signals on its own preferred time schedule. In some embodiments, that transmission may be periodic according to the periodicity parameter. In some embodiments, the transmission of the second LTE signal may be continuous or non-periodic. For instance, the eNB 405 may transmit data whenever it needs to without attempting to schedule around silence or active transmission periods of Wi-Fi networks or other devices, although such transmission may be intermittent.

Figure 10:
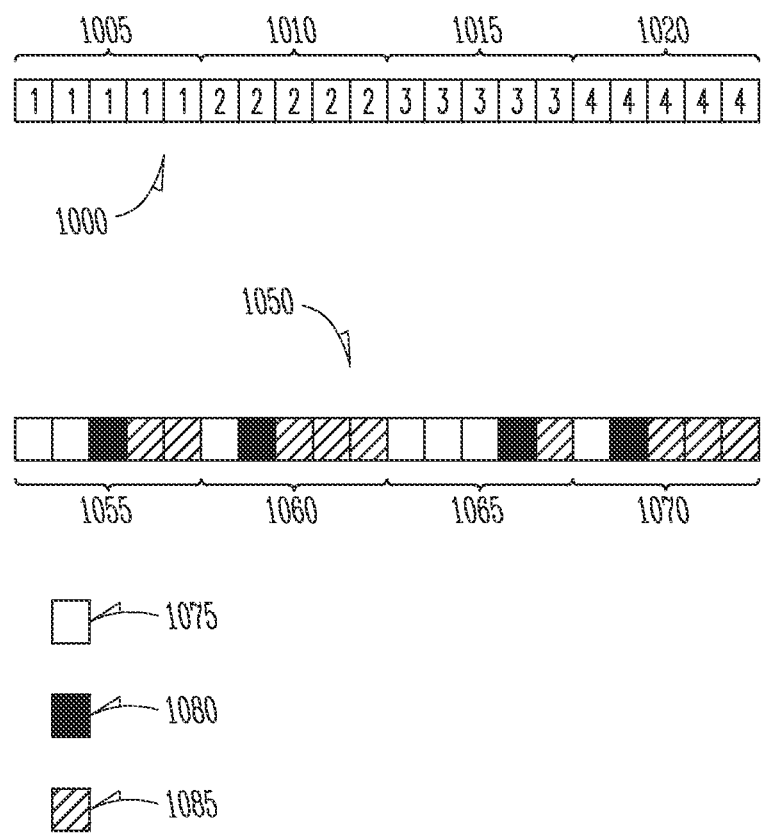
FIG. 10 illustrates discovery transmissions in accordance with some embodiments.

Referring to FIG. 10, a discovery transmission 1000 may be performed by an eNB 104 operating in licensed spectrum. A fixed periodic window such as 1005, 1010, 1015, 1020 may be used, and may include one or more sub-frames, labeled as 1, 2, 3, or 4 in the windows shown. A discovery signal may be transmitted by the eNB 104 during each window. In some embodiments, the discovery signal may be transmitted during some or all of the first sub-frame in each window, although not limited as such.

For an eNB 104 operating in unlicensed spectrum, discovery transmission 1050 may be employed. As other systems or devices may be utilizing the unlicensed spectrum, the eNB 104 may sense the channel to determine if the channel is busy or not. In response, the eNB 104 may refrain from transmission of discovery signals during busy periods (or sub-frames). Several example windows 1055, 1060, 1065, 1070 illustrate scenarios in which the eNB 104 may attempt to access the channel during the sub-frames in the beginning of the window (shown as blank according to 1075). The windows 1055, 1060, 1065, 1070 may be referred to as a periodic discovery transmission window or similar. The eNB 104 may transmit a discovery signal during some or all of a sub-frame in which it is determined that the channel is available (shown as solid according to 1080). In subsequent sub-frames in the remainder of the window, the eNB 104 may refrain from transmission of discovery signals, and may also enter a sleep mode (shown as dashed according to 1085). The discovery signal may be transmitted during the entire sub-frame, but is not limited as such, and may also be transmitted during any suitable number of symbol periods, frames or other unit of 3GPP or other standards.

The UE 102 may be aware of the periodic discovery transmission window, and may monitor for discovery signals from the eNB 104. The UE 102 may monitor for the discovery signals during a monitoring window, which may be the same as or different from the periodic discovery transmission window. The UE 102 may initially expect the discovery signal during the first chronological sub-frame of the periodic discovery transmission window. However, if the UE 102 does not receive the discovery signal during the first chronological sub-frame, the UE 102 may monitor subsequent sub-frames within the periodic discovery transmission window to receive the discovery signal. After receiving the discovery signal, the UE 102 may enter a sleep mode, or may attempt to transmit or receive other signals.

In some embodiments, the monitoring window and the periodic discovery transmission window may be the same length, and may be defined by a parameter that may be provided to the UE 102 in a Radio Resource Control (RRC) message or other message. In some embodiments, a specific monitoring window may be defined for the UE 102, and may be shorter than the periodic discovery transmission window. The size of the monitoring window may depend on categories for the UE 102. If the UE 102 does not receive the discovery signal during its monitoring window, it may enter a sleep mode and may awake at the first chronological sub-frame of the next monitoring window to receive, or attempt to receive, the next discovery signal transmission from the eNB 104. After receiving the discovery signal; the UE 102 may enter the sleep mode unless it is expected to transmit or receive other signals.

The eNB 104 may operate in an unlicensed frequency band, and may comprise hardware processing circuitry configured to monitor the frequency band for transmission activity of one or more other networks during a first chronological sub-frame of a periodic discovery transmission window comprising multiple non-overlapping contiguous sub-frames. In some embodiments, at least one of the other networks may be a Wi-Fi network. The hardware processing circuitry may be further configured to, when transmission inactivity is detected during the first chronological sub-frame, transmit a discovery signal in the frequency band during the first chronological sub-frame and refrain from transmission of discovery signals during each subsequent sub-frame of the periodic discovery transmission window. The hardware processing circuitry may be further configured to, when transmission activity is detected during the first chronological sub-frame, refrain from transmission of discovery signals during the first chronological sub-frame.

The hardware processing circuitry may be further configured to, when transmission activity is detected during the first chronological sub-frame, monitor the frequency band for transmission activity of the other networks during each subsequent sub-frame periodic discovery transmission window after the first chronological sub-frame until transmission inactivity is detected. The hardware processing circuitry may be further configured to, during each subsequent sub-frame periodic discovery transmission window in which transmission activity is detected, refrain from transmission of discovery signals. The hardware processing circuitry may be further configured to, during the sub-frame periodic discovery transmission window in which the transmission inactivity is detected, transmit a discovery signal. The hardware processing circuitry may be further configured to, during sub-frames of the periodic discovery transmission window subsequent to the sub-frame in which the transmission inactivity is detected, refrain from transmission of discovery signals. The hardware processing circuitry may be further configured to refrain from transmission of discovery signals during the periodic discovery transmission window when transmission activity is detected during all sub-frames of the periodic discovery transmission window.

In some embodiments, the first chronological sub-frame may begin at a pre-defined time related to a reference time for reception of discovery signals at one or more User Equipments (UEs). The eNB may be further configured to operate in an unlicensed LTE (U-LTE) network and the discovery signal may include a primary synchronization signal (PSS) or a secondary synchronization signal (SSS). The discovery signal may also be or may also include one or more cell-specific reference signals (CRS) or channel state information reference signals (CSI-RS). The discovery signal may also be or may also include a combination of PSS, SSS, CRS, CSI-RS or enhanced or other versions of such signals.

An eNB to communicate with one or more UEs on an LTE network operating in an unlicensed frequency band is disclosed herein. The eNB may comprise hardware processing circuitry to transmit a first LTE signal that includes a first reference signal during an active transmission period of a Wi-Fi network operating in the unlicensed frequency band, and to restrict frequency spectra used for the transmission of the first LTE signal from frequency spectra used by the Wi-Fi network during the active transmission period of the Wi-Fi network. In some embodiments, the first reference signal may enable maintenance of synchronization between the eNB and the UEs at least during the active transmission period of the Wi-Fi network.

In some embodiments, restricting the frequency spectra may include restricting the frequency spectra to frequency gaps of the Wi-Fi network that are included in the unlicensed frequency band. In some embodiments, restricting the frequency spectra may include selecting frequency spectra for transmission of the first LTE signal such that an LTE interference average power level caused to the frequency spectra used by the Wi-Fi network for transmission during the active transmission period of the Wi-Fi network is not greater than one percent of an average transmit power level of the Wi-Fi network.

The hardware processing circuitry may be further to transmit a second LTE signal during a silence period of the Wi-Fi network. In some embodiments, the second LTE signal may be transmitted in frequency spectra that includes at least a portion of the frequency spectra used by the Wi-Fi network during the active transmission period of the Wi-Fi network. In some embodiments, the second LTE signal may include a second reference signal that enables determination of channel state information or maintenance of synchronization at the UEs. In some embodiments, transmission of the first reference signal may be performed at an average power level at least 10 dB higher than the transmission of the second reference signal.

In some embodiments, the first LTE signal may be an OFDM signal comprising first resource elements REs and the second LTE signal may be an OFDM signal comprising second REs. In some embodiments, the transmission of the first reference signal may include transmission of first reference signal REs of the first LTE signal and the transmission of the second reference signal may include transmission of second reference signal REs of the second LTE signal. The transmission of the first reference signal REs may be performed at an average power level at least 10 dB higher than the transmission of the second reference signal REs. In some embodiments, the transmission of the second LTE signal may further include transmission of a data signal, the second REs may be associated with time and frequency locations, and the transmission of the data signal may include transmission of data REs of the second REs that are different in time location and frequency location than the second reference signal REs.

The hardware processing circuitry may be further to transmit a silence indicator that enables one or more of the UEs to determine an occurrence of a silence period or an active transmission period of the Wi-Fi network. In some embodiments, the silence indicator may be transmitted in a licensed frequency band that is disjoint from the unlicensed frequency band. In some embodiments, the LTE and Wi-Fi networks may operate independently from each other and the hardware processing circuitry may be further to determine an occurrence of a silence period or an active transmission period of the Wi-Fi network based at least partially on reception of wireless signals transmitted from one or more Wi-Fi devices operating as part of the Wi-Fi network. The hardware processing circuitry may be further to determine a Wi-Fi device operating as part of the Wi-Fi network, based at least partially on reception of a wireless signal transmitted from the Wi-Fi device. The hardware processing circuitry may be further to determine the silence period as a time period in which the eNB predicts that transmission of wireless signals from the Wi-Fi device is restricted.

An eNB to communicate with one or more UEs on an LTE network operating in an unlicensed frequency band is also disclosed herein. The eNB may comprise hardware processing circuitry to, when it is determined that one or more Wi-Fi networks are operating in the unlicensed frequency band, transmit a first LTE signal in the unlicensed frequency band during a silence period associated with the Wi-Fi networks and refrain from transmitting LTE signals in the unlicensed frequency band during an active transmission period associated with the Wi-Fi networks. In some embodiments, the first LTE signal may include a first reference signal that may enable maintenance of synchronization between the eNB and the UEs. The hardware processing circuitry may be further to, when it is determined that Wi-Fi networks are not operating in the unlicensed frequency band, transmit a second LTE signal in the unlicensed frequency band during periodic time intervals according to a periodicity parameter.

In some embodiments, the first LTE signal may be an OFDM signal comprising first REs. In some embodiments, the first reference signal may occupy first reference signal REs of the first REs. The hardware processing circuitry may be further to transmit a silence indicator that may enable one or more of the UEs to determine an occurrence of a silence period or an active transmission period of the one or more Wi-Fi networks. In some embodiments, the silence indicator may be transmitted in a licensed frequency band that is disjoint from the unlicensed frequency band. In some embodiments, the LTE network may operate independently from the one or more Wi-Fi networks. In some embodiments, the hardware processing circuitry may be further to determine an occurrence of a silence period or an active transmission period of the Wi-Fi networks based at least partially on reception of wireless signals transmitted from one or more Wi-Fi devices operating as part of the Wi-Fi networks.

A non-transitory computer-readable storage medium that stores instructions for execution by one or more processors to perform operations for communicating with one or more User Equipments (UEs) on an LTE network operating in an unlicensed frequency band is disclosed herein. The operations may configure the one or more processors to transmit a first LTE signal that includes a first reference signal during an active transmission period of a Wi-Fi network operating in the unlicensed frequency band and to restrict frequency spectra used for the transmission of the first LTE signal from frequency spectra used by the Wi-Fi network during the active transmission period of the Wi-Fi network. In some embodiments, the first reference signal may enable maintenance of synchronization between the eNB and the UEs at least during the active transmission period of the Wi-Fi network. In some embodiments, restricting the frequency spectra may include restricting the frequency spectra to frequency gaps of the Wi-Fi network that are included in the unlicensed frequency band or selecting frequency spectra for transmission of the first LTE signal such that an LTE interference average power level caused to the frequency spectra used by the Wi-Fi network for transmission during the active transmission period of the Wi-Fi network is not greater than one percent of an average transmit power level of the Wi-Fi network.

The operations may further configure the one or more processors to transmit a second LTE signal during a silence period of the Wi-Fi network. In some embodiments, the second LTE signal may be transmitted in frequency spectra that includes at least a portion of the frequency spectra used by the Wi-Fi network during the active transmission period of the Wi-Fi network. The first LTE signal may be an OFDM signal comprising first REs and the second LTE signal may be an OFDM signal comprising second REs. In some embodiments, transmission of the first reference signal may include transmission of first reference signal REs of the first LTE signal and the transmission of the second reference signal may include transmission of second reference signal REs of the second LTE signal. In some embodiments, the transmission of the first reference signal REs may be performed at an average power level at least 10 dB higher than the transmission of the second reference signal REs. The operations may further configure the one or more processors to transmit a silence indicator that enables one or more of the UEs to determine an occurrence of a silence period or an active transmission period of the Wi-Fi network. In some embodiments, the silence indicator may be transmitted in a licensed frequency band that is disjoint from the unlicensed frequency band.

A non-transitory computer-readable storage medium that stores instructions for execution by one or more processors to perform operations for communicating with one or more User Equipments (UEs) on an LTE network operating in an unlicensed frequency band is also disclosed herein. The operations may configure the one or more processors to, when it is determined that one or more Wi-Fi networks are operated in the unlicensed frequency band, transmit a first LTE signal in the unlicensed frequency band during a silence period associated with the Wi-Fi networks and refrain from transmitting LTE signals in the unlicensed frequency band during an active transmission period associated with the Wi-Fi networks. In some embodiments, the first LTE signal may include a first reference signal that may enable maintenance of synchronization between the eNB and the UEs.

The operations may further configure the one or more processors to, when it is determined that Wi-Fi networks are not operating in the unlicensed frequency band, transmit a second LTE signal in the unlicensed frequency band during periodic time intervals according to a periodicity parameter. In some embodiments, the first LTE signal may be an OFDM signal comprising first REs. In some embodiments, the first reference signal may occupy first reference signal REs of the first REs. The operations may further configure the one or more processors to transmit a silence indicator that may enable one or more of the UEs to determine an occurrence of a silence period or an active transmission period of the one or more Wi-Fi networks. In some embodiments, the silence indicator may be transmitted in a licensed frequency band that is disjoint from the unlicensed frequency band.

A method of communicating with one or more User Equipments (UEs) on an LTE network operating in an unlicensed frequency band is disclosed herein. The method may comprise transmitting a first LTE signal that includes a first reference signal during an active transmission period of a Wi-Fi network operating in the unlicensed frequency band. The method may further comprise restricting frequency spectra used for the transmission of the first LTE signal from frequency spectra used by the Wi-Fi network during the active transmission period of the Wi-Fi network. In some embodiments, the first reference signal may enable maintenance of synchronization between the eNB and the UEs at least during the active transmission period of the Wi-Fi network. The method may further comprise transmitting a second LTE signal during a silence period of the Wi-Fi network. In some embodiments, the second LTE signal may be transmitted in frequency spectra that includes at least a portion of the frequency spectra used by the Wi-Fi network during the active transmission period of the Wi-Fi network.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An Evolved Node-B (eNB) to communicate with one or more User Equipments (UEs) on a Long Term Evolution (LTE) network operating in an unlicensed frequency band, the eNB comprising:
   a transceiver; and
   hardware processing circuitry in communication with the transceiver arranged to:
      cause the transceiver to transmit, in the unlicensed frequency band, a first LTE signal that includes a first reference signal during an active transmission period of a Wi-Fi network operating in the unlicensed frequency band;
      restrict frequency spectra used for the transmission of the first LTE signal from frequency spectra used by the Wi-Fi network during the active transmission period of the Wi-Fi network, wherein the first reference signal enables maintenance of synchronization between the eNB and the one or more UEs at least during the active transmission period of the Wi-Fi network;
      cause the transceiver to transmit a second LTE signal during a silence period of the Wi-Fi network, the second LTE signal transmitted in frequency spectra that includes at least a portion of the frequency spectra used by the Wi-Fi network during the active transmission period of the Wi-Fi network, the second LTE signal comprising a second reference signal; and
      cause the transceiver to transmit a silence indicator that enables one or more of the UEs to determine an occurrence of at least one of a silence period or an active transmission period of the Wi-Fi network, the active transmission period being a time period that contains a transmission of a Wi-Fi device in the Wi-Fi network and the silence period being a time period that is free from transmission of the Wi-Fi device, the silence indicator comprising at least one of:
         a time at which the at least one of the silence period or active transmission period occurs, or
         an indication that the Wi-Fi network is currently in the silence period or active transmission period.

2. The eNB according to claim 1, wherein the processing circuitry is further arranged to restrict the frequency spectra by selection of frequency spectra for transmission of the first LTE signal such that an LTE interference average power level caused to the frequency spectra used by the Wi-Fi network for transmission during the active transmission period of the network is not greater than one percent of an average transmit power level of the Wi-Fi network.

3. The eNB according to claim 1, wherein:
   the second LTE signal includes a second reference signal that enables determination of channel state information or maintenance of synchronization at the UEs; and
   the transmission of the first reference signal is performed at an average power level at least 10 dB higher than the transmission of the second reference signal.

4. The eNB according to claim 3, wherein:
   the second LTE signal occupies more bandwidth than the second LTE signal, and to compensate for a bandwidth different, at least one of:
      the first reference signal is longer than the second reference signal in time, and
      the first reference signal is repeated.

5. The eNB according to claim 3, wherein:
   the second LTE signal is transmitted at a higher power than the second LTE signal, and to compensate for a different in transmission power, at least one of:
      the first reference signal is longer than the second reference signal in time, and
      the first reference signal is repeated.

6. The eNB according to claim 1, wherein:
   the first LTE signal is an orthogonal frequency division multiplexing (OFDM) signal comprising first resource elements (REs);
   the second LTE signal is an OFDM signal comprising second REs; and
   the transmission of the first reference signal includes transmission of first reference signal REs of the first LTE signal and the transmission of the second reference signal includes transmission of second reference signal REs of the second LTE signal.

7. The eNB according to claim 6, wherein:
   the transmission of the second LTE signal further includes transmission of a data signal;
   the second REs are associated with time and frequency locations; and
   the transmission of the data signal includes transmission of data REs of the second REs that are different in time location and frequency location than the second reference signal REs.

8. The eNB according to claim 1, wherein the silence indicator is transmitted in a licensed frequency band that is disjoint from the unlicensed frequency band.

9. The eNB according to claim 1, wherein:
   the LTE, and Wi-Fi networks operate independently from each other; and
   the hardware processing circuitry is further arranged to determine an occurrence of the silence period or the active transmission period of the Wi-Fi network based at least partially on reception of wireless signals transmitted from one or more Wi-Fi devices operating as part of the Wi-Fi network.

10. The eNB according to claim 1, wherein the hardware processing circuitry is further arranged to:
   determine transmission of the Wi-Fi device based at least partially on reception of a wireless signal transmitted from the Wi-Fi device; and
   predict the at least one of the silence period or active transmission period from a pattern of the at least one of the silence period or active transmission period based on observations of previous transmissions of wireless signals from the Wi-Fi device along with knowledge about a Wi-Fi protocol used by the Wi-Fi network.

11. The eNB according to claim 1, wherein the first and second LTE signals occupy different amounts of bandwidth.

12. The eNB according to claim 11, wherein the second LTE signal occupies more bandwidth than the second LTE signal.

13. The eNB according to claim 11, wherein the first and second LTE signals have different formats, a format of the first LTE signal based on a bandwidth of the first LTE signal and a bandwidth of the second LTE signal.

14. The eNB according to claim 1, wherein the silence indicator is transmitted in another unlicensed frequency band that is different from the unlicensed frequency band.

15. The eNB according to claim 1, wherein the hardware processing circuitry is further configured to determine on which band to transmit the silence indicator based on an amount of traffic on the licensed frequency band.

16. The eNB according to claim 1, wherein:
the frequency spectra used by the Wi-Fi network during the active transmission period of the Wi-Fi network comprises a gap at at least one edge of the unlicensed frequency band, and the hardware processing circuitry is further configured to cause the transceiver to transmit the first LTE signal in the gap.

17. An Evolved Node-B (eNB) to communicate with one or more User Equipments (UEs) on a Long Term Evolution (LTE) network operating in an unlicensed frequency band, the eNB comprising:
a transceiver; and
hardware processing circuitry in communication with the transceiver and arranged to:
when it is determined that one or more Wi-Fi networks are operating in the unlicensed frequency band:
cause the transceiver to transmit a first LTE signal in the unlicensed frequency band during a silence period associated with the Wi-Fi networks;
cause the transceiver to refrain from transmitting LTE signals in the unlicensed frequency band used by the Wi-Fi network during an active transmission period associated with the Wi-Fi networks, the LTE signals transmitted in the unlicensed frequency band during the active transmission period, wherein the first LTE signal includes a first reference signal that enables maintenance of synchronization between the eNB and the UEs;
when it is determined that Wi-Fi networks are not operating in the unlicensed frequency band, cause the transceiver to transmit a second LTE signal during periodic time intervals according to a periodicity parameter, the second LTE signal comprising a second reference signal; and
cause the transceiver to transmit a silence indicator that enables one or more of the UEs to determine an occurrence of at least one of the silence period or an active transmission period of the Wi-Fi network, the active transmission period being a time period that contains a transmission of a Wi-Fi device in the Wi-Fi network and the silence period being a time period that is free from transmission of the Wi-Fi device, the silence indicator comprising at least one of:
a time at which the at least one of the silence period or active transmission period occurs, or
an indication that the Wi-Fi network is currently in the silence period or active transmission period.

18. The eNB according to claim 17, wherein:
the first LTE signal is an orthogonal frequency division multiplexing (OFDM) signal comprising first resource elements (REs); and
the first reference signal occupies first reference signal REs of the first REs.

19. The mobile eNB according to claim 17, wherein the silence indicator is transmitted in a licensed frequency band that is disjoint from the unlicensed frequency band.

20. The eNB according to claim 17, wherein:
the LTE network operates independently from the one or more Wi-Fi networks; and
the hardware processing circuitry is further arranged to determine an occurrence of the silence period or the active transmission period of the networks based at least partially on reception of wireless signals transmitted from one or more devices operating as part of the networks.

21. A non-transitory computer-readable storage medium that stores instructions for execution by one or more processors in an evolved NodeB (eNB) to perform operations for communicating with one or more User Equipments (UEs) on a Long Term Evolution (LTE) network operating in an unlicensed frequency band, the operations to configure the one or more processors to cause the eNB to:
transmit in the unlicensed frequency band a first LTE signal that includes a first reference signal during an active transmission period of a Wi-Fi network operating in the unlicensed frequency band;
restrict frequency spectra used for the transmission of the first LTE signal from frequency spectra used by the network during the active transmission period of the Wi-Fi network, wherein the first reference signal enables maintenance of synchronization between the eNB and the UEs at least during the active transmission period of the Wi-Fi network;
transmit a second LTE signal during a silence period of the Wi-Fi network, wherein the second LTE signal is transmitted in frequency spectra that includes at least a portion of the frequency spectra used by the Wi-Fi network during the active transmission period of the Wi-Fi network, the second LTE signal comprising a second reference signal; and
transmit a silence indicator that enables one or more of the UEs to determine an occurrence of at least one of the silence period or an active transmission period of the Wi-Fi network, the active transmission period being a time period that contains a transmission of a Wi-Fi device in the Wi-Fi network and the silence period being a time period that is free from transmission of the Wi-Fi device, the silence indicator comprising at least one of:
a time at which the at least one of the silence period or active transmission period occurs, or
an indication that the Wi-Fi network is currently in the silence period or active transmission period.

22. The non-transitory computer-readable storage medium according to claim 21, wherein the operations further configure the eNB to restrict the frequency spectra by restricting the frequency spectra to frequency gaps of the Wi-Fi network that are included in the unlicensed frequency band or selecting frequency spectra for transmission of the first LTE signal such that an LTE interference average power level caused to the frequency spectra used by the Wi-Fi network for transmission during the active transmission period of the Wi-F network is not greater than one percent of an average transmit power level of the Wi-Fi network.

23. The non-transitory computer-readable storage medium according to claim 21, wherein:
the first LTE signal is an orthogonal frequency division multiplexing (OFDM) signal comprising first resource elements (REs);
the second LTE signal is an OFDM signal comprising second REs; and
the transmission of the first reference signal includes transmission of first reference signal REs of the first LTE signal and the transmission of the second reference signal includes transmission of second reference signal REs of the second LTE signal.

24. The non-transitory computer-readable storage medium according to claim 21, wherein the silence indicator is transmitted in a licensed frequency band that is disjoint from the unlicensed frequency band.

25. A method of communicating with one or more User Equipments (UEs) on a Long Term Evolution (LTE) network operating in an unlicensed frequency band, the method comprising:
transmitting in the unlicensed frequency band a first LTE signal that includes a first reference signal during an active transmission period of a Wi-Fi network operating in the unlicensed frequency band;
restricting frequency spectra used for the transmission of the first LTE signal from frequency spectra used by the Wi-Fi network during the active transmission period of the Wi-Fi network, wherein the first reference signal enables maintenance of synchronization between the eNB and the UEs at least during the active transmission period of the Wi-Fi network;
transmitting a second LTE signal during a silence period of the Wi-Fi network, wherein the second LTE signal is transmitted in frequency spectra that includes at least a portion of the frequency spectra used by the Wi-Fi network during the active transmission period of the Wi-Fi network, the second LTE signal comprising a second reference signal; and
transmit a silence indicator that enables one or more of the UEs to determine an occurrence of at least one of the silence period or an active transmission period of the Wi-Fi network, the active transmission period being a time period that contains a transmission of a Wi-Fi device in the Wi-Fi network and the silence period being a time period that is free from transmission of the Wi-Fi device, the silence indicator comprising at least one of:
a time at which the at least one of the silence period or active transmission period occurs, or
an indication that the Wi-Fi network is currently in the silence period or active transmission period.

26. An Evolved Node-B (eNB) to operate in an unlicensed frequency band, the eNB comprising:
a transceiver; and
hardware processing circuitry in communication with the transceiver and configured to:
monitor the unlicensed frequency band for transmission activity of one or more other networks during a first chronological sub-frame of a periodic discovery transmission window comprising multiple non-overlapping contiguous sub-frames;
when transmission inactivity is detected during the first chronological sub-frame, cause the transceiver to transmit a discovery signal in the unlicensed frequency band during the first chronological sub-frame and refrain from transmission of discovery signals during each subsequent sub-frame of the periodic discovery transmission window;
when transmission activity is detected during the first chronological sub-frame, cause the transceiver to refrain from transmission of discovery signals during the first chronological sub-frame;
cause the transceiver to transmit a second LTE signal during a silence period of the Wi-Fi network, wherein the second LTE signal is transmitted in frequency spectra that includes at least a portion of the frequency spectra used by the Wi-Fi network during the active transmission period of the Wi-Fi network, the second LTE signal comprising a second reference signal; and
cause the transceiver to transmit a silence indicator that enables one or more of the UEs to determine an occurrence of at least one of the silence period or an active transmission period of the Wi-Fi network, the active transmission period being a time period that contains a transmission of a Wi-Fi device in the Wi-Fi network and the silence period being a time period that is free from transmission of the Wi-Fi device, the silence indicator comprising at least one of:
a time at which the at least one of the silence period or active transmission period occurs, or
an indication that the Wi-Fi network is currently in the silence period or active transmission period.

27. The eNB according to claim 26, the hardware processing circuitry is further configured to, when transmission activity is detected during the first chronological sub-frame:
monitor the unlicensed frequency band for transmission activity of the other networks during each subsequent sub-frame periodic discovery transmission window after the first chronological sub-frame until transmission inactivity is detected;
during each subsequent sub-frame periodic discovery transmission window in which transmission activity is detected, cause the transceiver to refrain from transmission of discovery signals;
during the sub-frame periodic discovery transmission window in which the transmission inactivity is detected, cause the transceiver to transmit a discovery signal; and
during sub-frames of the periodic discovery transmission window subsequent to the subframe in which the transmission inactivity is detected, cause the transceiver to refrain from transmission of discovery signals.

28. The eNB according to claim 27, wherein the hardware processing circuitry is further configured to cause the transceiver to refrain from transmission of discovery signals during the periodic discovery transmission window when transmission activity is detected during all sub-frames of the periodic discovery transmission window.

29. The eNB according to claim 26, wherein the first chronological sub-frame begins at a pre-defined time related to a reference time for reception of discovery signals at one or more User Equipments (UEs).

30. The eNB according to claim 26, wherein the eNB is further configured to operate in an unlicensed LTE (U-LTE) network and the discovery signal includes a primary synchronization signal (PSS) or a secondary synchronization signal (SSS).

31. The NB according to claim 26, wherein at least one of the other networks is a Wi-Fi network.

* * * * *

UNITED STATES PATENT AND TRADEMARK OFFICE
CERTIFICATE OF CORRECTION

PATENT NO. : 9,801,207 B2
APPLICATION NO. : 14/473008
DATED : October 24, 2017
INVENTOR(S) : Sergeyev et al.

Page 1 of 1

It is certified that error appears in the above-identified patent and that said Letters Patent is hereby corrected as shown below:

On the Title Page

On page 2, in Column 2, item (56), under "Foreign Patent Documents", Line 1, delete "102013003596" and insert --1020130035964-- therefor In the Claims In Column 17, Line 20, in Claim 1, after "transceiver", insert --and--

In Column 18, Line 42, in Claim 9, delete "LTE," and insert --LTE-- therefor

In Column 20, Line 8, in Claim 20, after "more", insert --Wi-Fi-- therefor

In Column 20, Line 9, in Claim 20, after "the", insert --Wi-Fi-- therefor

In Column 20, Line 22, in Claim 21, after "the", insert --Wi-Fi-- therefor

Signed and Sealed this
Eleventh Day of June, 2019

Andrei Iancu
*Director of the United States Patent and Trademark Office*